United States Patent [19]

Neukirchner et al.

[11] Patent Number: 5,023,798
[45] Date of Patent: Jun. 11, 1991

[54] METHOD OF AND APPARATUS FOR DETERMINING A POSITION OF A LAND VEHICLE

[75] Inventors: Ernst-Peter Neukirchner, Hildesheim; Dietmar Schlögl, Sibbesse, both of Fed. Rep. of Germany

[73] Assignee: Robert Bosch GmbH, Stuttgart, Fed. Rep. of Germany

[21] Appl. No.: 457,760

[22] PCT Filed: Jun. 4, 1988

[86] PCT No.: PCT/DE88/00332
§ 371 Date: Dec. 26, 1989
§ 102(e) Date: Dec. 26, 1989

[87] PCT Pub. No.: WO88/09916
PCT Pub. Date: Dec. 15, 1988

[30] Foreign Application Priority Data
Jun. 6, 1987 [DE] Fed. Rep. of Germany ....... 3718996

[51] Int. Cl.⁵ .............................................. G06F 15/50
[52] U.S. Cl. ................................... 364/449; 364/447; 340/995
[58] Field of Search ............... 364/449, 453, 454, 447; 340/990, 995

[56] References Cited

U.S. PATENT DOCUMENTS

| | | | |
|---|---|---|---|
| 4,796,191 | 1/1989 | Honey et al. | 364/450 |
| 4,897,792 | 1/1990 | Hosoi | 364/449 |
| 4,924,402 | 5/1990 | Ando et al. | 364/449 |
| 4,937,572 | 6/1990 | Yamada et al. | 364/449 |

OTHER PUBLICATIONS

"Car-Guide-on-Board Computer for Automobiles", 1984, pp. 697–706, National Computer Conference, 364/449.

Primary Examiner—Thomas G. Black
Attorney, Agent, or Firm—Michael J. Striker

[57] ABSTRACT

In a method of and an apparatus for determining the position of a land vehicle by detecting and evaluating driving data and subsequent correction of the position calculated from the driving data by matching with data of a stored, digitized road network, the determination of the position is carried out in a very reliable manner. By dividing the digital road network into meshes defined according to surface area by covering it with a grid. The meshes in which the instantaneous position of the vehicle is located, are selected one after the other proceeding from a starting position, and the position calculated from the driving data is corrected at predetermined intervals to the possible and most probable position through the road network in the respective selected mesh and its proximate surrounding area.

15 Claims, 3 Drawing Sheets

METHOD OF AND APPARATUS FOR DETERMINING A POSITION OF A LAND VEHICLE

BACKGROUND OF THE INVENTION

The invention relates to a method of and apparatus for determining a position of a land vehicle wherein a position determined from driving data is corrected in accordance with control data stored in a memory.

A system has been developed (Electronic Traffic Pilot for Automobile Drivers) which gives recommendations for an optimal driving route on the basis of the existing road network, the instantaneous position of the vehicle, and the origin and destination data. The reliability of this system depends among other things on the accuracy with which the instantaneous position of the vehicle can be determined.

Method and apparatuses for determining the position of a land vehicle which determine and evaluate only driving data such as travel distances and driving direction by using principles of dead reckoning position finding suffer from a loss of location after longer driving distances, which can lead to an erroneous recommendation. By repeated correction in the form of matching with data of a stored, digitized road network, this loss of location can be kept within limits such that the reliability of the recommendation is not impaired. However, in carrying out the matching, problems can occur which are based e.g. on the density of the road network, the limited memory space of the computer arrangement present in the vehicle, or the computing time required by the computer.

If the road network is very dense and the matching is carried out only at long intervals of space and time due to the required computing time, the position finding inaccuracy can accumulate in the meantime to the extent that the position determined from the driving data is indeed to be assigned to the road network, but this road network deviates from the actual position, and the matching is then made to the wrong street. It is not desirable to limit to a thinned out road network, since the system is required to issue recommendations between optional positions of origin and destination. Accordingly, it must be possible to take into account a region in the order of magnitude of a federal state or of the entire federal territory of the Federal Republic of Germany.

SUMMARY OF THE INVENTION

The object of the invention is a method of and an apparatus for determining the position of a land vehicle in such a way that a reliable and rapid matching of the position calculated from the driving data with the road network is made possible even with extensive, detailed road networks.

This object is achieved by subdividing a digitized road network in a plurality of meshes defined according to a surface area by covering the road network with a grid. Instantaneous vehicle positions are defined by respective meshes which are selected one after another beginning from a starting position. The position calculated from the driving data is corrected at predetermined intervals to a possible and most probable position in a respective selected mesh and a proximate area.

The invention is based on the understanding that the loss of location in the evaluation of driving data only accumulates gradually as the traveled distance increases and can, therefore, be kept within limits with rapid successive corrections. Consequently also, only the roads located in the vicinity of the calculated position play a role in the matching. Since the relevant roads change continuously while driving through the road network, a criterion is needed for choosing the roads which are to be utilized for the matching.

The invention provides this criterion by covering the digitized road network with a grid, so that the road network is now broken up into meshes and it can be unequivocally defined whether or not roads lie within the relevant region. But in order to be able to carry out an effective matching also when passing from one mesh to the other, the relevant region is not defined by a single mesh. Rather, that mesh within which the position calculated from the driving data is located is made into the center field of a larger region in which the roads are likewise made use of for the matching. Therefore, when the actual position does not lie in the defined mesh, but rather in an adjacent mesh, this does not lead to errors.

The data quantity required for the matching is kept approximately constant and at a comparatively low level by the formation of a region which forms the calculated position approximately as center and which slides along with the changing position of the vehicle, so that the matching can be carried out in a sufficiently brief period of time. The selection of the roads to which the calculated position is finally matched is effected according to the road viewed as most probable.

For this purpose, according to a further development, the relevant roads, that is the roads lying in the proximate surrounding area of the mesh in which the calculated position is located, are weighted differently. The weighting can be effected e.g. according to the proximity or the agreement of direction or a combination of the two. After a series of weightings or evaluations which are preferably effected from an adding of individual weightings until a threshold value is reached or exceeded, the position is then corrected to the road which has received the highest weighting Since the position finding inaccuracy is practically completely eliminated again by of the correction, the weighting can subsequently begin anew, so that the extent of data to be processed is accordingly also kept within limits, and a sufficiently high computing speed can be maintained.

A particularly user-friendly advantage of the process consists in that, because of the self-correction, the digital road network need only contain roads open to public traffic. Small, private roads, e.g., driveways, passages, gas station entrances or parking places, need not be considered. Rather, after returning to one of the roads stored in the digitized road network, the process is capable of reassigning the position of the vehicle to this road. It is also not necessary to enter the start point exactly, and this can be carried out in a very approximate manner, also when the vehicle is already in the garage or in a parking place which is not stored in the digitized road network.

The invention also provides a device which enables a reliable and rapid matching of the position calculated from the driving data to the road network, also in extensive detailed digitized road networks The device according to the invention comprises a memory that stores the grid for covering the digitized road network, and is connected with a computer that evaluates the driving data.

Whereas the first memory of the device comprises the digitized road network, a grid is stored in the second memory which covers the road network. The computer thus receives a road network which is broken up into a plurality of meshes and can make a selection from the entire road network as to which roads are to be utilized for the matching of the position calculated from the driving data to the digitized road network. The extent of the data to be taken into account can thus be limited and the determination and correction of the position can be carried out in a sufficiently short time.

The present invention both as to its construction so to its mode of operation, together with additional objects and advantages thereof, will be best understood from the following detailed description of specific embodiments when read in connection with the accompanying drawings.

DETAILED DESCRIPTION OF PREFERRED EMBODIMENT

Figure 1:
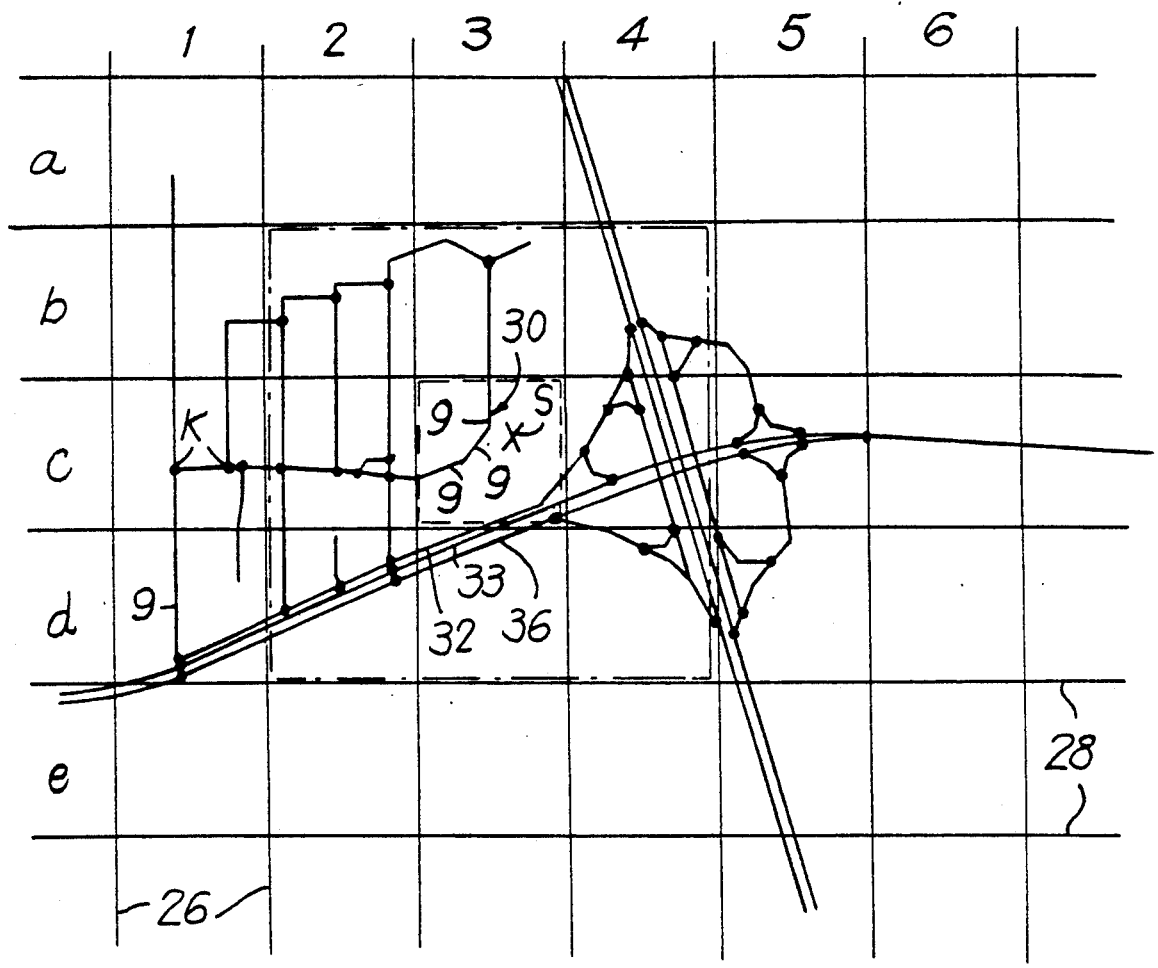
FIG. 1 shows a section from a road network which is subdivided into meshes by covering the network with a grid.

In the road network shown in FIG. 1, the roads are depicted as graphs, whose nodes represent the intersections k and whose edges represent the road segments g between two intersections. In the curved road segments, the edges are composed of straight segments g in such a way that deviations of the graph from the actual course of the road do not exceed predetermined limiting values, e.g., 10 meters, 15°. The graph is covered with a grid of vertical lines 26 and horizontal lines 28. The step size of the grid, that is the distance between two grid lines 26 or 28, depends on the road density or, as expressed in terms of graphs, the edge density. Road density is understood to mean the number of roads per surface area unit. The step size can vary between 125 meters in the city center area and approximately 1000 meters in the intercity network. It is preferably selected for each area in such a way that the number of roads touching a mesh does not substantially exceed the value of 10.

When breaking up the road network into meshes, a list containing the numbers of the roads located completely or partially within a respective mesh is applied to each mesh. Thus, the mesh with coordinate c, number 3 contains a list of roads 30, 32, 34 and 36. The mesh with coordinate d, number 3, contains only the roads 32, 34 and 36.

The relevant roads for the matching are not only determined by those meshes within which the instantaneous position of the vehicle is located. In FIG. 1, the mesh with coordinate c, number 3, there is the point of origin S; the roads located in the surrounding area of the selected mesh are also taken into account. The surrounding area is formed here by those meshes which adjoin the mesh in which the instantaneous position is located. Thus, in this case, eight additional meshes with coordinates b2, b3, b4, c2, c4, d2, d3 and d4 are involved. The region is emphasized graphically by a dash-dot border.

If the instantaneous position reaches another mesh, e.g. that with coordinate c2, the surrounding area is now formed additionally by the meshes with coordinates b1, c1 and d1, while the meshes with coordinates b4, c4 and d4 are omitted. In this way, there results a sufficiently large marginal region from which roads can be utilized for the matching, even when there is an erroneous calculation of the instantaneous position of the vehicle.

The process for determining the position proceeds substantially as follows: first, a starting position is entered, and the mesh within which the starting position is located is determined. Proceeding from this starting position, the calculation of the instantaneous position is effected. The driving data which is transmitted by a driving data transmitter and from which an instantaneous position is determined first serves for this purpose. However, as the driving distance increases, this instantaneous position deviates from the actual position. Thus, a location error occurs.

In order to eliminate the location error, the instantaneous position is matched at predetermined intervals with the stored road network and is corrected to a position which lies on one of the roads.

The roads utilized for the matching are located in the proximate surrounding area of the instantaneous position. These are preferably the roads situated within the mesh in which the instantaneous position lies, and the roads which are situated in the meshes surrounding the aforementioned mesh. Those roads which touch one or more of these meshes are taken into account, in addition.

The relevant roads are then weighted according to the probability that the calculated instantaneous position is located on them. The road with the highest weighting is finally selected, the instantaneous position is corrected in such a way that it lies on the road, and this new position is now used as starting point for further determination of the position.

Figure 2:
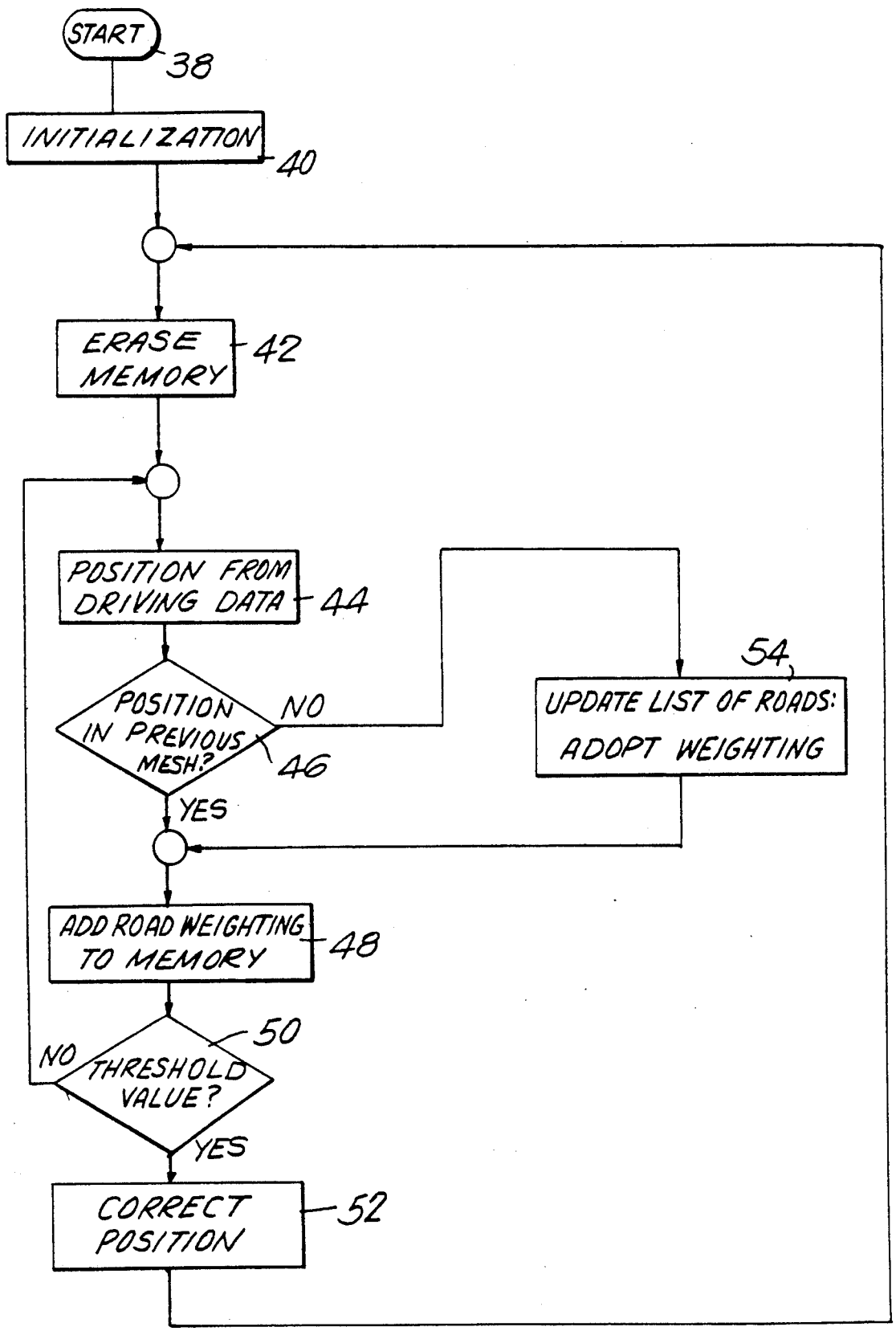
FIG. 2 shows a flow chart illustrating the method according to the invention.

Reference is made to the flow chart shown in FIG. 2 in order to explain a preferred course of the method. After the start in 38, an initialization is effected in 40. This is understood as a first-time input of the position of origin or the start position. Since no location error is present yet in this phase, the continued process can be introduced by erasing or resetting the evaluation memory for the weighting of the roads. This takes place in step 42. During driving, calculation of the position from the driving data is carried out in short intervals, maximum of 10 meters. This is effected in step 44. The calculation of position is preferably effected according to the principle of dead reckoning position finding, in which both the traveled distance and the driving direction are taken into account. A determination of the direction by means of a compass can also be utilized additionally.

In step 46, it is decided whether or not the calculated position lies in the previous mesh. When running through the process for the first time, the previous mesh is that in which the start position is located. Reference is always made to the preceding instantaneous position at every additional pass.

If the decision is affirmed, the roads are then weighted in step 48 corresponding to the probability that the instantaneous position could lie on one of the roads. The weighting can be effected e.g. in such a way that the distance of the calculated instantaneous position is compared with the individual roads and evaluation numbers are assigned to the roads in a staggered manner according to the distance. The road with the smallest distance receives the highest evaluation number, that with the greatest distance receives the smallest evaluation number. The same process is then effected between the driving direction and the direction of the roads. The road whose direction agrees to the greatest extent with the driving direction receives the maximum evaluation number, that which agrees least with the driving direction receives the lowest evaluation number. The evaluations between the distance and direction can also be combined.

A weighting according to the following algorithm has proven particularly advisable: Evaluation equals:

$$w = \frac{1}{|\phi_g - \phi_f|} \times \frac{1}{a}$$

The w is the weighting or evaluation, $\phi_g$ is the direction of a straight segment of the road, $\phi_f$ is the driving direction and a is the distance between the calculated position and the road.

After the weightings of the roads are calculated in step 48, they are added to an evaluation memory. The latter contains memory locations for the weightings of each of the relevant roads. The weightings are added up at every new calculation. After the calculation, it is decided, in 50, whether or not a threshold value has been reached. If this is the case, the calculated position is corrected in 52 to the road with the highest weighting. Next, the process course is continued in step 42.

If the threshold value is not reached in 50, the process course is continued with step 44. If the calculated instantaneous position does not lie in the previous mesh, a branching off is effected in steps 46 to 54, and the list of relevant roads which are to be weighted is updated. The new roads to be added are thus first weighted, the weightings of the roads no longer under consideration are deleted, and the weightings of the roads which will continue to be taken into consideration are adopted. Next, the process step continues with step 48.

Figure 3:
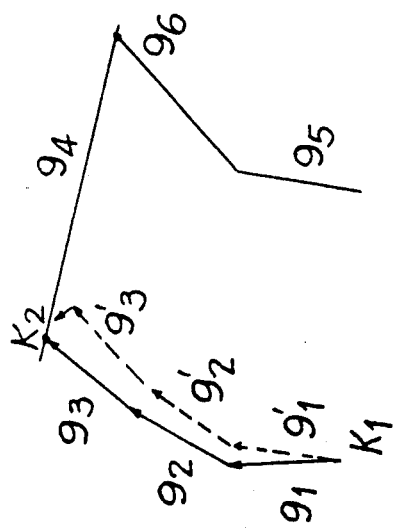
FIG. 3 shows a vector view to illustrate the matching process.

Reference is made to the vector view in FIG. 3 to illustrate the weighting. A vehicle is to be driven from the intersection $k_1$ to the intersection $k_2$. In so doing, the straight segments $g_1$, $g_2$ and $g_3$ are traveled. The determination of the position on the basis of the driving data which are supposed to be erroneous results in a virtual driving segment from the straight lines $g_1'$, $g_2'$ and $g_3'$. After every straight segment g, a calculation of the instantaneous position and a weighting of the total roads $g_1$–$g_6$ to be taken into account is effected.

If the weighting is carried out only according to the distance or only according to the direction, the straight line segment $g_4$, for example, could receive high weighting because of the small distance or the straight line segments $g_5$ and $g_6$ could receive high weighting because of the agreement of direction. However, as a result of combining the two criteria the end of the straight line $g_3$ appears as the most probable position after driving over the virtual straight line segment $g_3'$, and the instantaneous position is accordingly corrected to this position.

Figure 4:
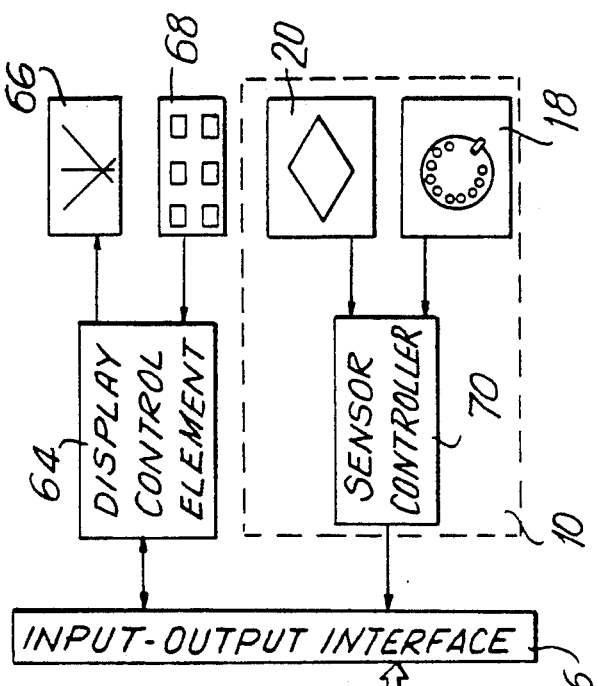
FIG. 4 shows a block wiring diagram of an apparatus according to the invention.
Figure 4:
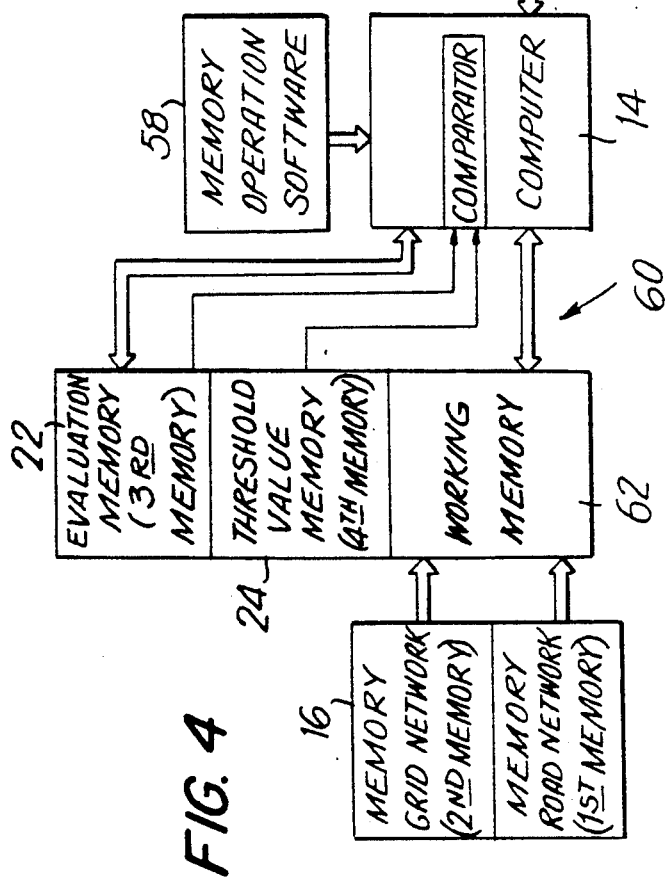

Finally, FIG. 4 shows a block wiring diagram of the device according to the invention. This comprises a computer 14, to which driving data of a driving data transmitter 10 is fed via an input-output interface 56, as well as a first memory 12 for a digitized road network and a second memory 16 for a grid network. In addition, a memory 58 for the operation software and a write-read memory arrangement 60 are connected with the computer 14. The write-read memory arrangement 60 comprises a working memory 62, a third memory 22 for an evaluation or weighting of the roads, and a fourth memory 24 for a threshold value. Further, the computer is also connected, via the input-output interface 56, with a display and control element 64 which comprises a display 66 and an input keyboard 68. The driving data transmitter 10 particularly comprises a sensor controller 70 as well as wheel sensors 18 and a compass 20.

The starting position is first entered in the computer 14 via the input keyboard 68. During driving, the driving data transmitter 10 supplies, at predetermined intervals, driving data which proceed from the wheel sensors 18 and possibly from the compass 20 and are evaluated in the computer 14 according to the principle of dead reckoning position finding. The instantaneous position is calculated from the driving data.

The road network stored in the first memory and the grid network stored in the second memory are transferred to the working memory in portions until the mesh is found within which the instantaneous position is located. This mesh, the meshes adjoining this mesh, and the roads lying within this region are then copied into the working memory 62. A weighting of the relevant roads, i.e. those in the mesh in which the instantaneous position is located and roads located in the adjoining meshes, as well as the roads touching the meshes, is also carried out at every calculation of the instantaneous position. The results of this weighting are transferred to the third memory 22 for every road and added to the values already there.

After every such process, a comparison is made between the weightings and a threshold value stored in the fourth memory 24. This takes place in a comparator, wherein the comparator can be discretely present or can be realized by means of a corresponding control of the computer 14. If the threshold value is reached or exceeded, the computer 14 carries out a matching of the instantaneous position to the position of the most highly weighted road and erases the third memory 22.

Next, the process begins anew until the threshold value is exceeded again by one of the values determining the weighting of the roads. In this manner, a loss of bearing occurring in the meantime is always eliminated again.

A very fast calculation is made possible due to the reduction, achieved with the invention, of the amount of data sufficient for this computing process. This is particularly necessary in a dense road network in a large city. If the computer determines that the vehicle approaches an intersection or fork at which the driving direction must be changed, it sends a corresponding recommendation via the display 66. These recommendations are given until the destination position is reached or a new destination position is entered.

While the invention has been illustrated and described as embodied in a method and apparatus for determining a position of a land vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of determining a position of a land vehicle, comprising the steps of dividing a digital road network in a plurality of meshes in a grid-like manner with each mesh containing a predetermined number of street sections that should not be exceeded; determining and evaluating driving data and calculating a position of the vehicle in accordance with the driving data; and correcting the calculated position of the vehicle by comparing the calculated position with possible positions of the digital road network wherein only street sections contained at least in a mesh in which the calculated position is located, are considered.

2. A method according to claim 1, wherein the comparing includes considering street sections contained at least in one of meshes that surround the mesh in which the calculated position is located.

3. A method according to claim 1, wherein the comparing includes weighting of each considered street section.

4. A method according to claim 3, wherein the weighting is determined by at least one of a proximity of the calculated position to each considered street section, comparison of street angles, and agreement of a street course with a driving direction of the vehicle.

5. A method according to claim 3, wherein the weighting is effected in regular intervals and weighting results are added.

6. A method according to claim 3, wherein said correcting step includes correcting the calculated position of the vehicle in accordance with a street section having a highest weighting value.

7. A method according to claim 3, wherein said correcting step includes correcting the calculated position in accordance with a respective street section only when weighting value of the respective street section exceeds a predetermined value.

8. A method according to claim 1, wherein a size of a mesh is determined in accordance with a number of streets.

9. A method according to claim 1, wherein a size of a mesh is determined in accordance with street density.

10. An apparatus for determining a position of a land vehicle, comprising a driving data sensor; a first memory for storing a digital road network; computer means for evaluating the driving data and subsequent correction of a position calculated from the driving data by matching with data of the stored digital road network; and a second memory for storing a mesh grid of the digital road network and containing, for each mesh of the grid, a list of number of streets of the digital road network and including all streets which lie at least partially in a respective mesh.

11. An apparatus according to claim 10, wherein the list of number of streets includes all streets that completely lie in a respective mesh.

12. An apparatus according to claim 10, wherein said driving data sensor comprises a sensor for sensing distance and direction data.

13. An apparatus according to claim 12, wherein said driving data sensor comprises a compass for detecting direction data.

14. An apparatus according to claim 10, further comprising a third memory for storing weighting data.

15. An apparatus according to claim 10, further comprising a working memory connected with said computer means and said first memory for storing street sections of a mesh in which the calculated position of the vehicle is located, and street sections of meshes which border the mesh in which the calculated position is located.

* * * * *